US009444190B2

(12) United States Patent
Duran et al.

(10) Patent No.: US 9,444,190 B2
(45) Date of Patent: Sep. 13, 2016

(54) ADAPTER FOR MOUNTING PROTECTOR MODULE TO GROUND

(71) Applicant: CORNING OPTICAL COMMUNICATIONS LLC, Hickory, NC (US)

(72) Inventors: Christian Shane Duran, Fort Worth, TX (US); John Austin Keenum, Haltom City, TX (US); Rodger Alan Tenholder, Saginaw, TX (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/597,876

(22) Filed: Jan. 15, 2015

(65) Prior Publication Data

US 2016/0211617 A1 Jul. 21, 2016

(51) Int. Cl.
*H01R 4/66* (2006.01)
*H01R 13/648* (2006.01)
*H01R 4/24* (2006.01)

(52) U.S. Cl.
CPC .......... *H01R 13/648* (2013.01); *H01R 4/2404* (2013.01)

(58) Field of Classification Search
CPC ............ H01R 13/648; H01R 13/6581; H01R 13/6582; H01R 13/6591; H01R 13/6597
USPC ............................. 439/92, 95, 105, 108, 922
See application file for complete search history.

(56) References Cited

U.S. PATENT DOCUMENTS

| | | | |
|---|---|---|---|
| 3,985,412 A * | 10/1976 | Hoffman | H01R 13/648 439/105 |
| 5,479,505 A | 12/1995 | Butler et al. | |
| 6,283,771 B1 * | 9/2001 | Mitchell | H01R 4/64 439/95 |
| 6,799,980 B2 * | 10/2004 | Bloomfield | H01R 4/66 439/92 |
| 7,116,779 B1 | 10/2006 | Meyerhoefer et al. | |
| 8,139,761 B2 | 3/2012 | Vo et al. | |
| 2007/0160195 A1 | 7/2007 | Vo et al. | |

OTHER PUBLICATIONS

International Search Report and Written Opinion of the International Searching Authority; PCT/US2016/013600; Mailed May 20, 2016; 10 Pages.

* cited by examiner

*Primary Examiner* — Khiem Nguyen
(74) *Attorney, Agent, or Firm* — Robert L. Branham (57) ABSTRACT

An adapter for grounding a protector module in a network interface device (NID) is provided. The adapter includes a body, and at least one ground mount area on the body. Each ground mount area includes a ground post extending from the body and configured to conductively couple to the protector module. A connector extends from the body and is configured to conductively couple to a grounding element of the NID. The body, the at least one ground post and the connector are conductive. The adapter allows for reuse of existing protector modules that do not have a ground adapter for direct mounting to a ground post by using the vertical grounding feature found in the protector module.

25 Claims, 9 Drawing Sheets

ADAPTER FOR MOUNTING PROTECTOR MODULE TO GROUND

BACKGROUND

1. Field

The disclosure relates generally to a telecommunications apparatus and more particularly to an adapter for mounting a protector module to a ground, which may be used in, for example, network interface device applications.

2. Technical Background

Telephone service is provided by a telephone company ("provider") to a number of different customers of the provider, commonly referred to as "subscribers." Each subscriber may purchase as many separate telephone lines as desired and equip his or her home or business with various types of telephone equipment. Subscribers are responsible for proper operation of the telephone equipment and the provider is responsible for proper operation of the telephone network up to the interface between the provider wiring and the subscriber wiring.

A telephone network interface device ("NID") typically serves as a demarcation point between the provider wiring and the subscriber wiring. NIDs serve the function of isolating the provider portion of the system or wiring from that of the respective subscribers. Such isolation is desirable in order to segregate the responsibility for faults or malfunctions that may occur in the respective parts of the system.

In practice, known NID designs are typically mounted to an exterior wall of a house or building. Conventional NIDs generally include a container or housing, the interior of which is divided into a provider portion and a subscriber portion. Provider wiring typically enters the NID and terminates in the provider portion. The subscriber wiring typically enters the NID and terminates in the subscriber portion. At least one interconnect apparatus is located between the two portions and generally operates to connect the subscriber wiring to the provider wiring. The provider portion also typically contains protective devices to protect equipment and users from excess voltages.

As used herein, the term "interconnect apparatus" or "terminating device" is intended to include any type of known connector for interconnecting service provider wiring with subscriber wiring, configured with or without a "protector module" for protecting against a voltage and/or current surge, including but not limited to a line module, a protected terminating device ("PTD"), or the like. Known interconnect apparatuses are typically a modular device that can be mounted in the subscriber portion of the NID and easily replaced if rendered inoperable. Prior art terminating devices, such as line modules, typically include a housing and a cover that can pivot between a closed position and an open position. The housing of the line module includes a pair of insertion channels that allow the provider wires to be electrically coupled with a pair of contacts located in an integrated jack. In the current installation process, a service provider's wiring is connected to a protector module and the protector module is connected to the line module.

Presently, the demarcation point arrangement is undergoing updates. In the new process, the service provider's wiring connects to the protector module as before except instead of being connected to the line module, the wiring goes into the premises and is connected to a jack, which is sometimes referred to as an i-Jack. The jack now acts as the demarcation point. This is where the subscriber connects to a gateway that provides all the services requested. The gateway has a connection back to the jack that sends the plain-old-telephone service (POTS) or voice-over-Internet-protocol (VoIP) to POTS back to the jack. Wiring from the jack returns to the NID and is connected to the line module and the subscriber's wiring. The line module does not contain a disconnect point.

The current change in the demarcation point arrangement presents opportunities to reuse certain structures within older, legacy NIDS, and in particular, protector modules. Two types of protector modules, oftentimes referred to as universal station protector modules (USP), are commonly used in NIDs. A first type is used for adding a line to a subscriber service with an older, legacy NID, and is referred to as an add-a-line kit. The kit provides a protector module coupled to a line module either directly or using a length of wire. In this setting, the protector module includes ground adapters, e.g., tangs, wings or tabs, on each side which can be broken off easily to allow mounting the protector module onto a ground bar or adapter with a ground post. If installed into a common NID footprint, such as the UNI™ Series Universal NID (UNID) available from Corning Optical Communications LLC, the ground adapters have to be broken off in order to mount the protector module onto a ground post using a push-on method of grounding/mounting the protector module. More specifically, the protector module has a clip that is inside a pocket that pushes onto a vertical ground post to make contact. In addition, where the protector module is factory installed in the NID, e.g., a UNID, the protector module does not have the ground adapters because the protector module directly presses down on a vertical grounding element of the NID and, consequently, the ground adapters are not needed.

When upgrading service in the field, e.g., to accommodate the new demarcation point arrangement, it is beneficial to reuse existing protector modules. That is, an existing protector module may be removed from an old NID and de-coupled from any line module to which it is attached, and re-used in a new NID. However, if the protector module does not have a ground adapter because it did not originally have one or it has been previously removed, the protector module cannot be re-used.

SUMMARY

One embodiment of the disclosure relates to an adapter for grounding a protector module in a network interface device (NID). The adapter may include a body. At least one ground mount area may be disposed on the body with each ground mount area including a ground post extending from the body and configured to conductively couple to the protector module. A connector may extend from the body and be configured to conductively couple to a grounding element of the NID. The body, the at least one ground post and the connector are conductive.

An additional embodiment of the disclosure relates to an adapter for grounding a protector module in a network interface device (NID). The adapter may include a body. A pair of ground mount areas may be disposed on the body, and each ground mount area may include a ground post extending from the body and configured to conductively couple to the protector module. A connector may extend from the body and be configured to conductively couple to a grounding element of the NID. The body, the ground posts and the connector are conductive.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Throughout this description, positional terms, such as left, right, top, bottom, front, rear, side, etc., and relative terms, such as larger, smaller, nearer, farther, etc., are utilized herein for purposes of explanation only, and as such, should not be construed as limiting the scope of the invention or the appended claims in any manner. In the embodiments shown, the adapter is capable of accommodating various examples of protector modules now known or hereafter devised.

Embodiments disclosed in the detailed description include an adapter for grounding a protector module in a network interface device (NID), where the protector module does not including an integral ground adapter. The adapter allows for reuse of existing protector modules that do not have an integral ground adapter for direct mounting to a grounding element of the NID by using a ground post receptacle in the protector module.

Figure 1:
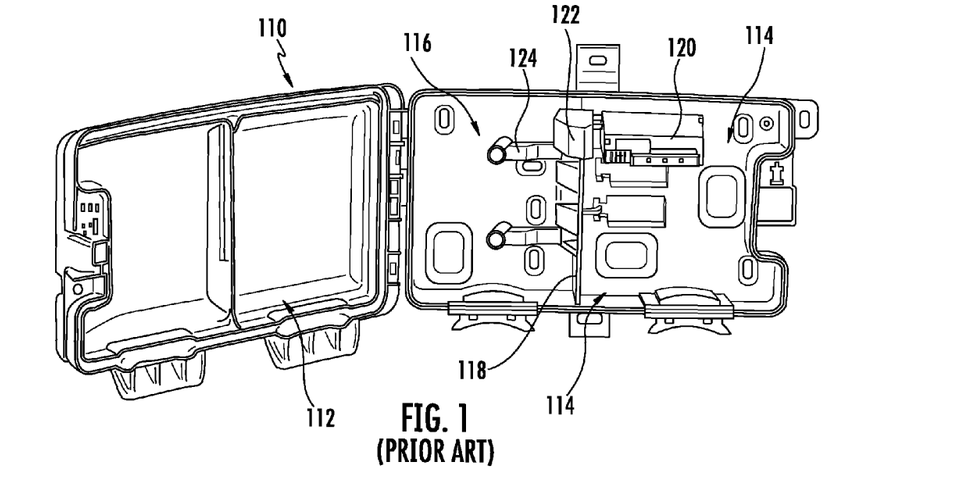
FIG. 1 is a front, perspective view of one illustrative conventional network interface device.

Referring now to FIG. 1, an illustrative NID 110, such as a UNI™ Series Universal NID (UNID) available from Corning Optical Communications LLC, is shown in a perspective view. NID 110 includes a cover 112 and a base 114. In FIG. 1, NID 110 is shown open to reveal a subscriber side 114 and a provider side 116 segmented by a divider 118 in base 114. A line module 120 including a coupled protector module 122 is shown mounted in NID 110 as it would be during factory installation. Protector module 122 is conductively coupled to grounding element 124, which in operation electrically grounds protector module 122 via wiring (not shown) to a ground in the premises in which NID 110 is employed. While a particular embodiment of NID 110 has been illustrated, as will become apparent herein, the teachings of the invention are applicable to a wide variety of NIDs.

Figures 2, 3:
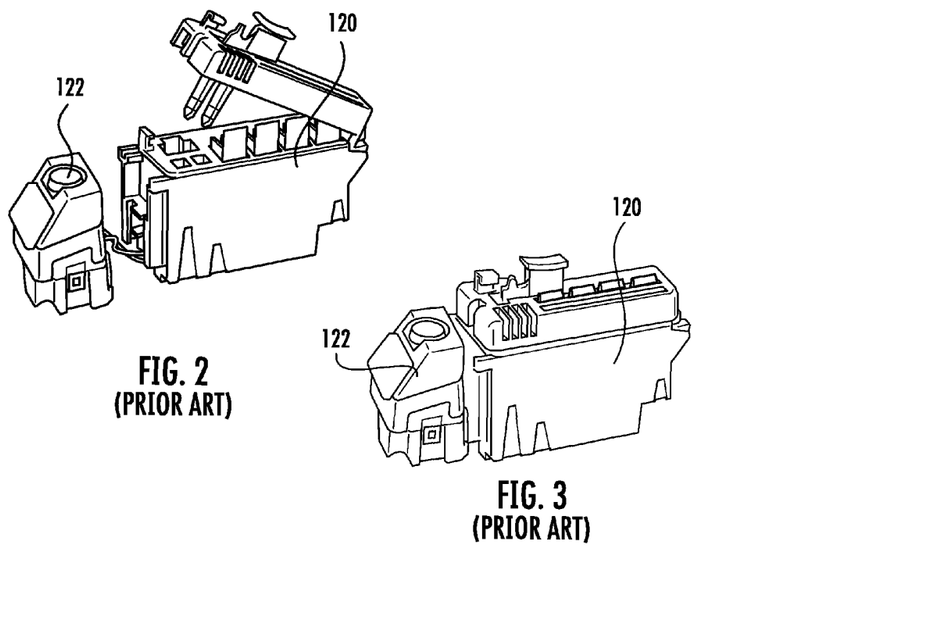
FIGS. 2 and 3 are front, perspective views of a conventional protector module uncoupled but with wiring (FIG. 2) and directly coupled (FIG. 3) to a line module.
Figure 4:
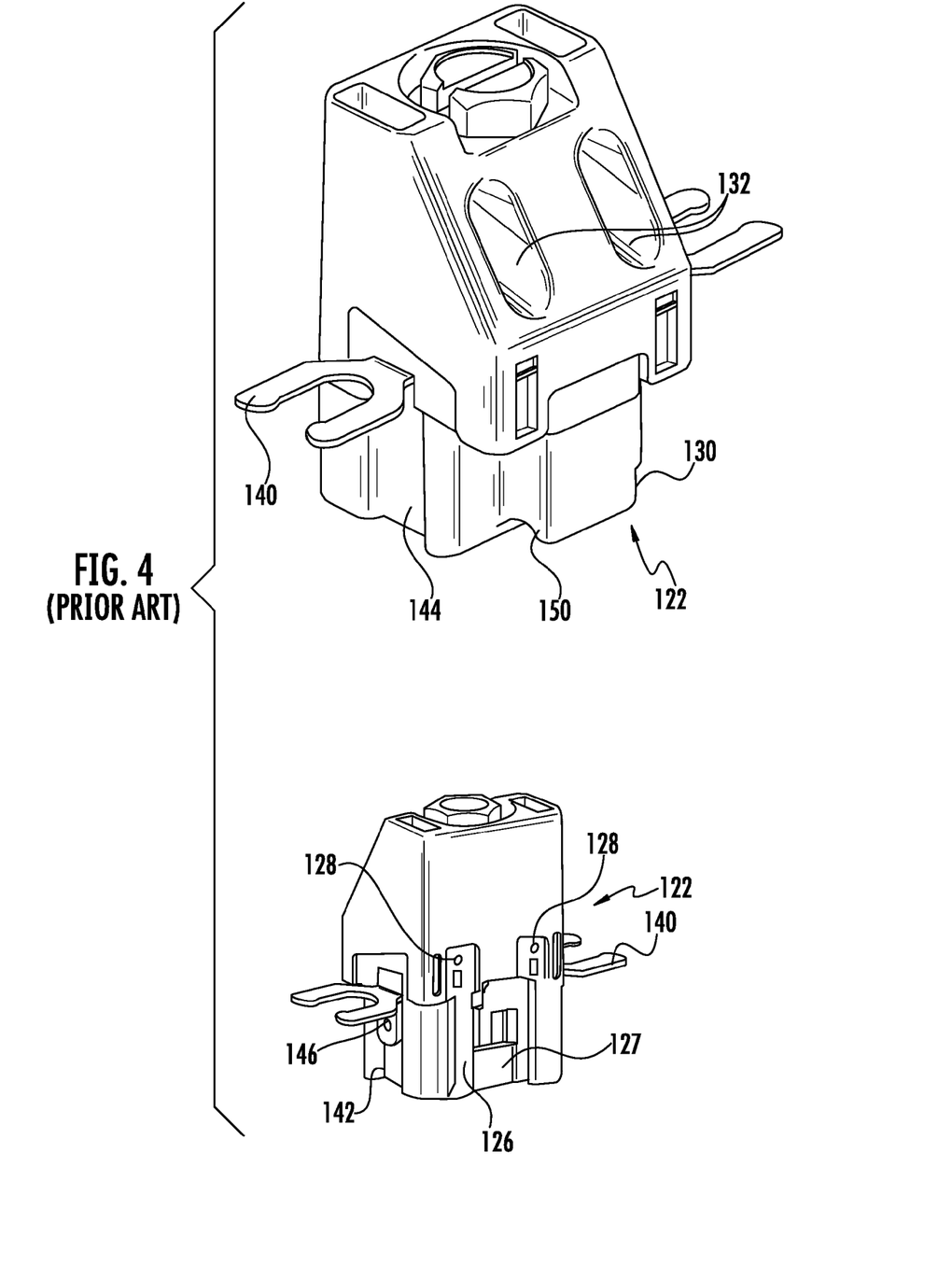
FIG. 4 is a perspective, exploded view of a conventional protector module.

FIGS. 2-3 show perspective views of line module 120 and protector module 122 separate from NID 110 and in a uncoupled but with wiring (FIG. 2) and directly coupled (FIG. 3) state, respectively. In addition, FIG. 4 shows perspective views of protector module 122. Protector module 122 may include a conventional universal station protector module (USP) available from Corning Optical Communications LLC, or similar apparatus. Details of protector module 122 are described in U.S. Pat. No. 8,139,761, entitled Network Interface Device, Apparatus, and Methods, issued Mar. 20, 2012, which is hereby incorporated by reference. As understood, protector module 122 includes internal circuitry to protect electrical components coupled thereto, e.g., line module 120, against a voltage and/or current surge. As shown in FIG. 4, a back side 126 of protector module 122 may include two openings 128 to receive two subscriber wires, and front side 130 may include two openings 132 to receive two provider wires.

Where protector module 122 has been installed as an add-on kit, e.g., with line module 120 (FIGS. 2-3) coupled thereto, protector module 122 may include a ground adapter 140 (FIG. 4 only) coupled to the internal circuitry thereof for coupling to a grounding element 124 (FIG. 1) of NID 110 (FIG. 1). In some cases, protector module 122 may be supplied as a separate unit with ground adapter 140. In any case, where ground adapter 140 is provided, it may be removably attached to a front side 130 or back side 126 of protector module 122. Protector module 122 may also have a first side 142 and a second side 144 where a ground adapter 140 can be mounted. Ground adapter 140 may slide onto a mounting tab 146, but may be coupled in other ways to protector module 122. In some cases, ground adapter 140 may be fixedly coupled to a mounting location (near 146), and include a mechanism for permanent removal, e.g., through breaking it from protector module 122. In any event, ground adapter 140 may be removed, oftentimes in a way that it cannot be re-installed.

Protector module 122 also includes a ground post receptacle 150 into which a ground post (not shown in FIG. 1) of grounding element 124 (FIG. 1) in NID 110 may be received for electrical connection to internal circuitry of protector module 122. As noted herein, when protector module 122 is mounted in NID 110 (FIG. 1) in a factory setting, protector module 122 does not include a ground adapter because it is not necessary as protector module 122 is coupled by way of ground post receptacle 150. Embodiments of the invention provide an adapter for allowing use or re-use of protector module 122 that does not include a ground adapter 140.

Figure 5:
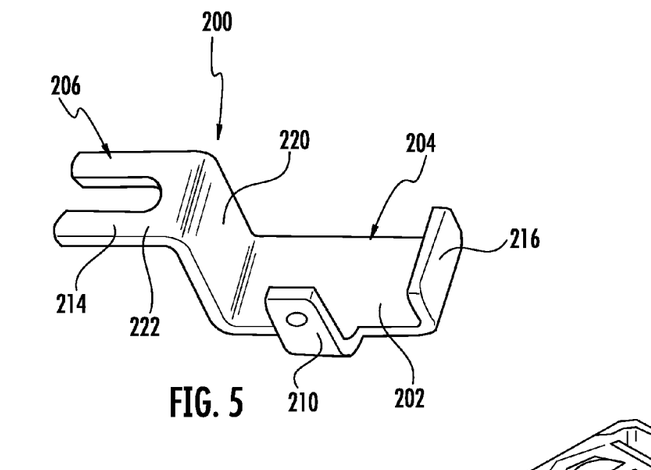
FIG. 5 is a front, perspective of an adapter according to embodiments of the invention.
Figure 6:
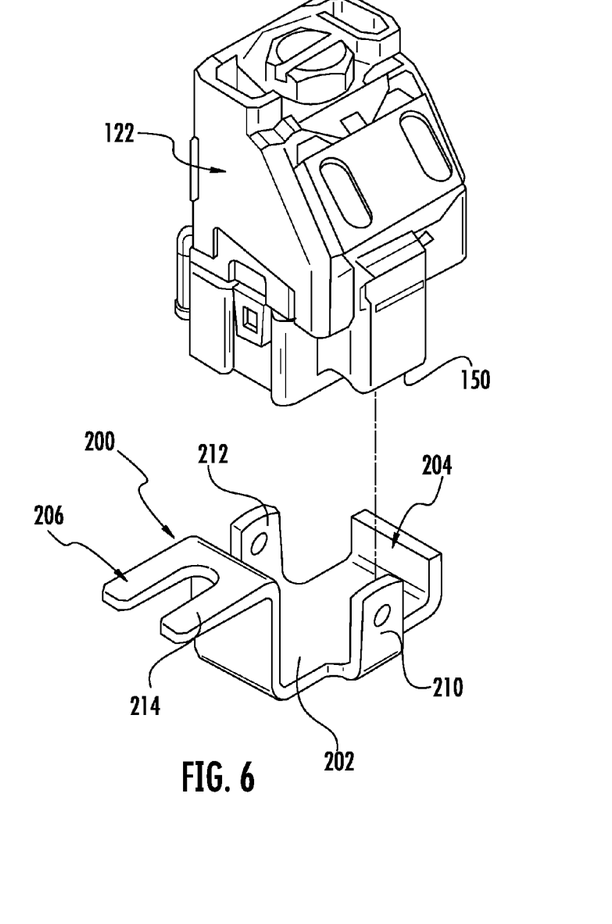
FIG. 6 is a front, perspective of an alternative embodiment of the adapter with a protector module.
Figure 7:
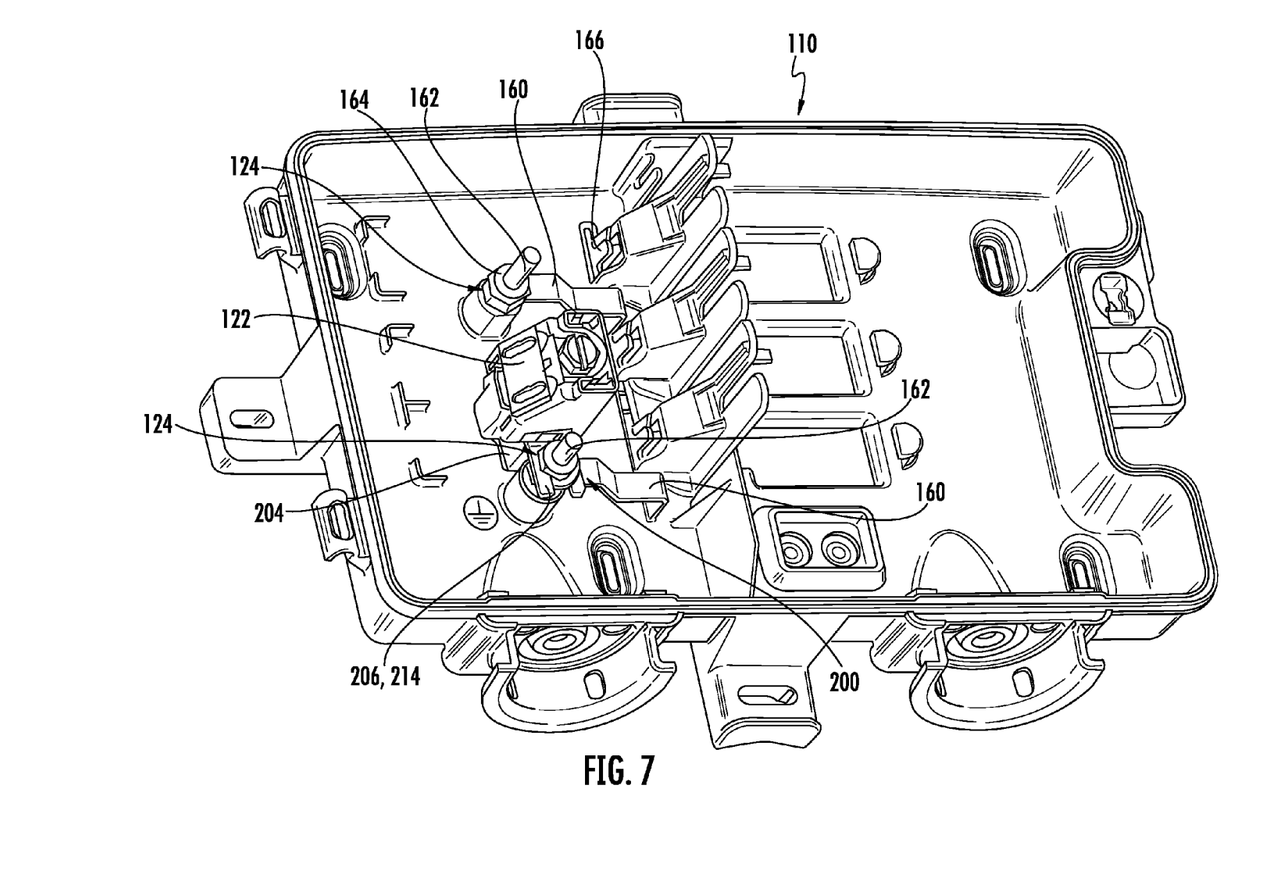
FIG. 7 is a perspective view of the network interface device of FIG. 1 employing the adapter of FIGS. 5 and 6.
Figure 8:
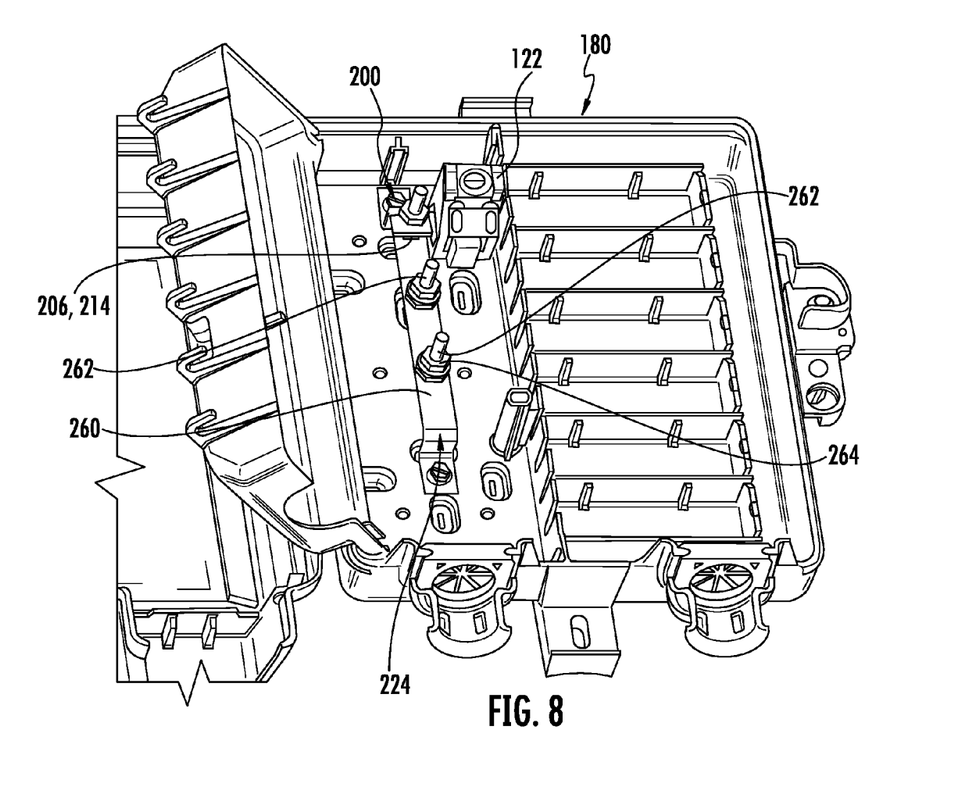
FIG. 8 is a perspective view of an older, legacy network interface device employing the adapter of FIGS. 5 and 6.

Referring to FIGS. 5-8, one embodiment of an adapter 200 for grounding a protector module 122 in a NID is illustrated. FIGS. 5 and 6 show perspective views of embodiments of adapter 200, and in FIGS. 7 and 8, two example NIDs are shown employing adapter 200. NID 110 illustrated in FIG. 7 is substantially similar to that shown in FIG. 1 with the cover removed. Here, grounding element 124 includes one or more ground bars 160, each having a threaded post 162 at each end with a nut 164. Ground bars 160 also each include a ground post 166, dimensioned similarly to ground post 210 (FIGS. 5-6) to which protector module 122 can couple. Protector module 122 can couple to ground post 166 independently or when it is directly coupled to line module 120, as shown in FIG. 1. NID 180 illustrated in FIG. 8 represents an older, legacy NID having a grounding element 124 structured differently than that of NID 110 (FIG. 7). Here, a grounding element 224 includes an elongated ground bar 260 having a number of threaded posts 262 spaced therealong with a nut 264 on each. Elongated ground bar 260 runs substantially perpendicular to a length of NID 180. As will be described, adapter 200 provides a mechanism for coupling protector module 122 to grounding element 124, 224 even though protector module 122 does not include any ground adapter 140 (FIG. 3). As will be apparent, adapter 200, along with other embodiments of the adapter described herein, can be employed in a wide variety of NIDS other than those illustrated herein.

As shown best in FIGS. 5-6, adapter 200 may include a body 202, at least one ground mount area 204 on body 202 for mounting protector module 122, and a connector 206 extending from body 202 to conductively couple to grounding element 124 (FIG. 7) of NID 110 (FIG. 7). In FIGS. 5-6, a single ground mount area 204 is provided on body 202 for receiving a single protector module 122. As will be described herein, in another embodiment, more than one ground mount area 204 may be provided to accommodate more than one protector module 122. Each ground mount area 204 includes a ground post 210 extending from body 202 and configured to conductively couple to protector module 122. In particular, as shown in FIG. 6, ground post 210 is dimensioned to be received in ground post receptacle 150 (FIG. 6) in protector module 122 to make electrically conductive path from internal circuitry of protector module 122 to adapter 200. That is, each ground post 210 has a length, width and/or height to fit securely and snugly in ground post receptacle 150, as shown in FIGS. 7 and 8, such that protector module 122 cannot slip off of ground post 210 without sufficient external force being applied. Body 202 may include any structure for coupling ground mount area(s) 204 (and ground post(s)) to connector 206.

Figure 9:
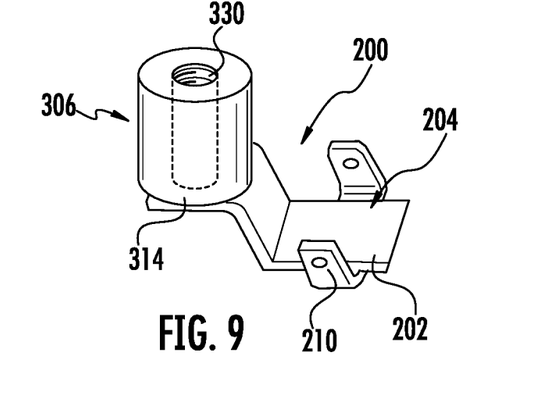
FIGS. 9-11 are perspective views of alternative embodiments of the adapter.

In the example shown in FIG. 5, a single ground post 210 is provided. However, in another embodiment, shown in FIG. 6, a pair of ground posts 210, 212 may be provided extending from opposing sides of body 202. Opposing ground posts 210, 212 allow for protector module 122 to be coupled to body 202 facing in either direction, which may accommodate ease of mounting and interconnection with other components within NID 110, 180 (e.g., line module 120 (FIG. 1)), and coupling of adapter 200 to grounding element 124. Where two ground posts 210, 212 are used, the ground post that is not used in ground post receptacle 150 may align with an opening 127 (FIG. 4) on back side 126 (FIG. 4) of protector module 122 to provide additional module alignment and/or retention, if desired. In the embodiments shown in FIGS. 5-8, adapter 200 includes a stiffener member 216 extending from body 202; however, as shown in FIG. 9, stiffener member 216 is optional.

Connector 206 extends from body 202 and is configured to conductively couple to grounding element 124, 224 (FIGS. 7 and 8, respectively) of the NID. In FIGS. 5 and 6, connector 206 includes a U-shaped, conductive tang 214 configured to conductively couple with grounding element 124, 224 of the NID. As shown in FIGS. 7 and 8, in this embodiment, U-shaped tang 214 surrounds a selected threaded post 162, 262 and is retained thereto by nut 164, 264, respectively. While adapter 200 and protector module 122 have been illustrated in selected locations within NID 110, 180, connector 206 allows for protector module 122 to be positioned in a number of alternative positions. For example, in FIG. 7, for the protector module 122 illustrated, adapter 200 could couple the module in any position in the approximately 180° space about the selected threaded post 162. Adapter 200 could also couple the module to any of the threaded posts 162 shown in FIG. 7. In FIG. 8, adapter 200 could be coupled to any selected threaded post 262 and on either side of ground bar 260. Where both ground posts 210, 212 (FIG. 6) are employed, protector module 122 could face in a direction opposite to that shown in FIGS. 7 and 8.

Figure 10:
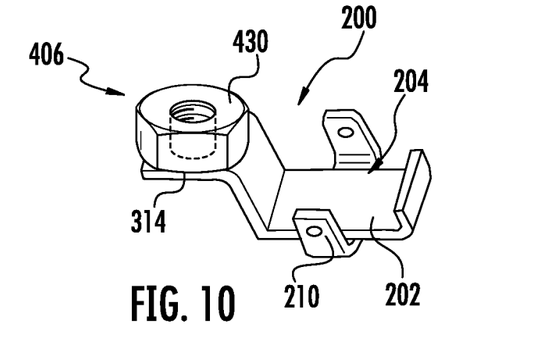

Adapter 200 may include a variety of alternative structures. In one embodiment, shown in FIG. 9, a connector 306 can include a post receptacle 330 configured to conductively couple with grounding element 124, 224 of the NID, e.g., by sliding contact placement over threaded post 162, 262. FIG. 9 also shows body 202 without optional stiffener member 216 (FIG. 5). In another embodiment, shown in FIG. 10, a connector 406 may include a threaded fastener 430 irremovably but rotatably coupled to body 202 and configured to conductively couple by threaded engagement onto threaded post 162, 262. In another embodiment, a screw could threadably couple through connector to a grounding element 124, e.g., through a hole in the connector or U-shaped tang 214. In another embodiment, a clamping or crimping element could be attached to the connector for clamping onto or crimping to grounding element 124, 224. While a number of different connectors have been described herein, it is understood that others may be possible and are considered within the scope of the invention.

Returning to FIGS. 5 and 6, each connector may also be shaped so as to conductively couple to grounding element 124, 224 of the NID in a first plane different than a second plane in which body 202 is disposed. That is, body 202 is offset from the connector. In particular, each connector may include a first portion 220 extending from body 202 at a non-linear angle, and a second portion 222 extending from first portion 220 at a non-linear angle, so as to allow for coupling of adapter 200 in a first plane to grounding element 124, 224 different than a second plane in which body 202 and ground mount area 204 are disposed. In this fashion, protector module 122 may be coupled to grounding element 124, 224 yet be positioned as far into base 114 of the NID as possible. Different size connectors may be dimensioned to accommodate different NIDS.

Figure 11:
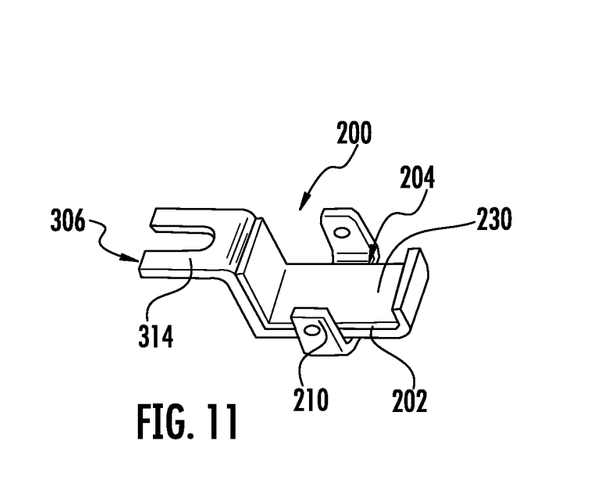

Adapter 200 can be formed from any conductive material. In the embodiments shown, adapter 200 is illustrated as a stamped metal, such as brass, aluminum, copper, etc. In any event, in this embodiment, body 202, ground post 210, 212 and connector 206 are all conductive. It is understood, however, that adapter 200 may be formed with other parts that are not conductive as a conductive path from ground post to connector is all that is necessary. For example, in one embodiment shown in FIG. 11, an insulative cover 230 may be provided over at least a portion of body 202, e.g., body 202 and part of connector 306. Insulative cover 230 can be formed of any molded, insulative material such as but not limited to a plastic.

Figure 12:
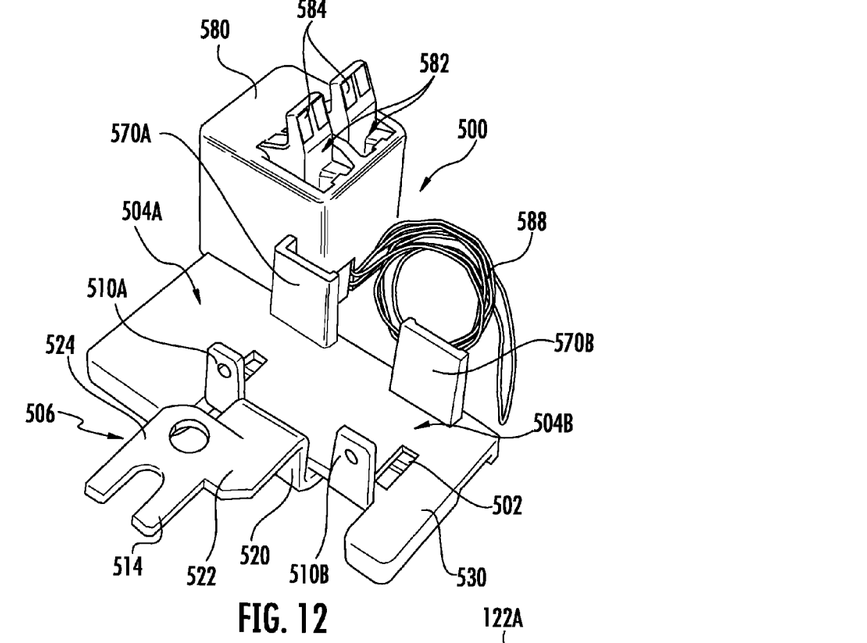
FIGS. 12-15 are perspective views of alternative embodiments of an adapter for a pair of protector modules.
Figures 13, 14:
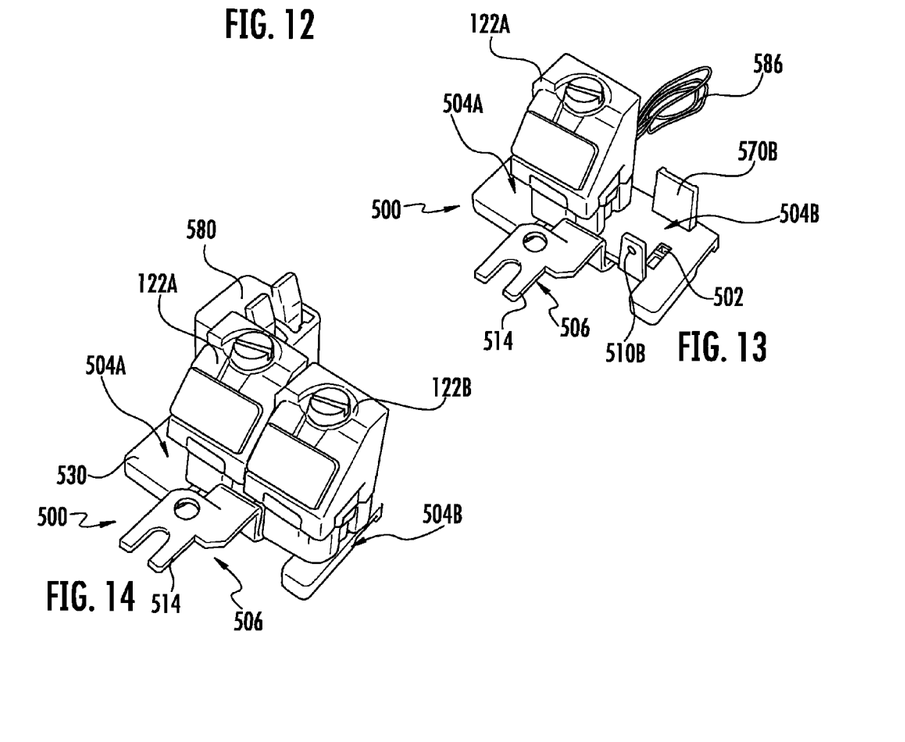
Figure 15:
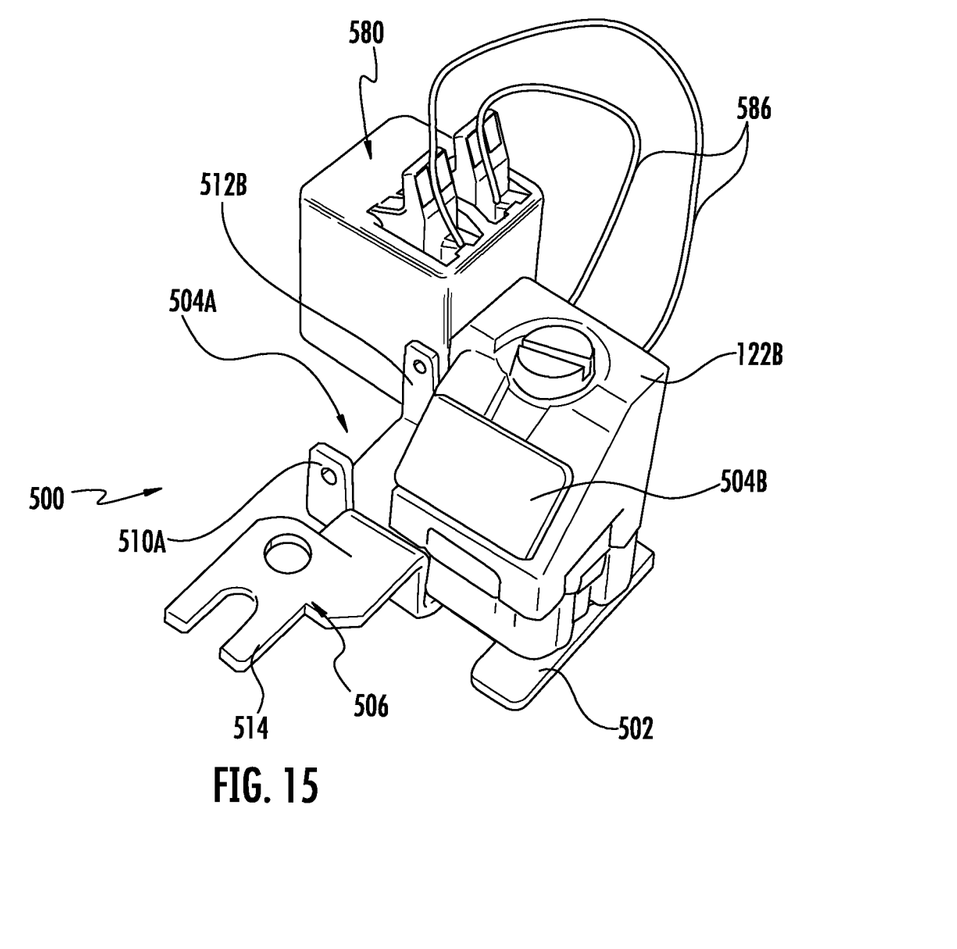
Figure 16:
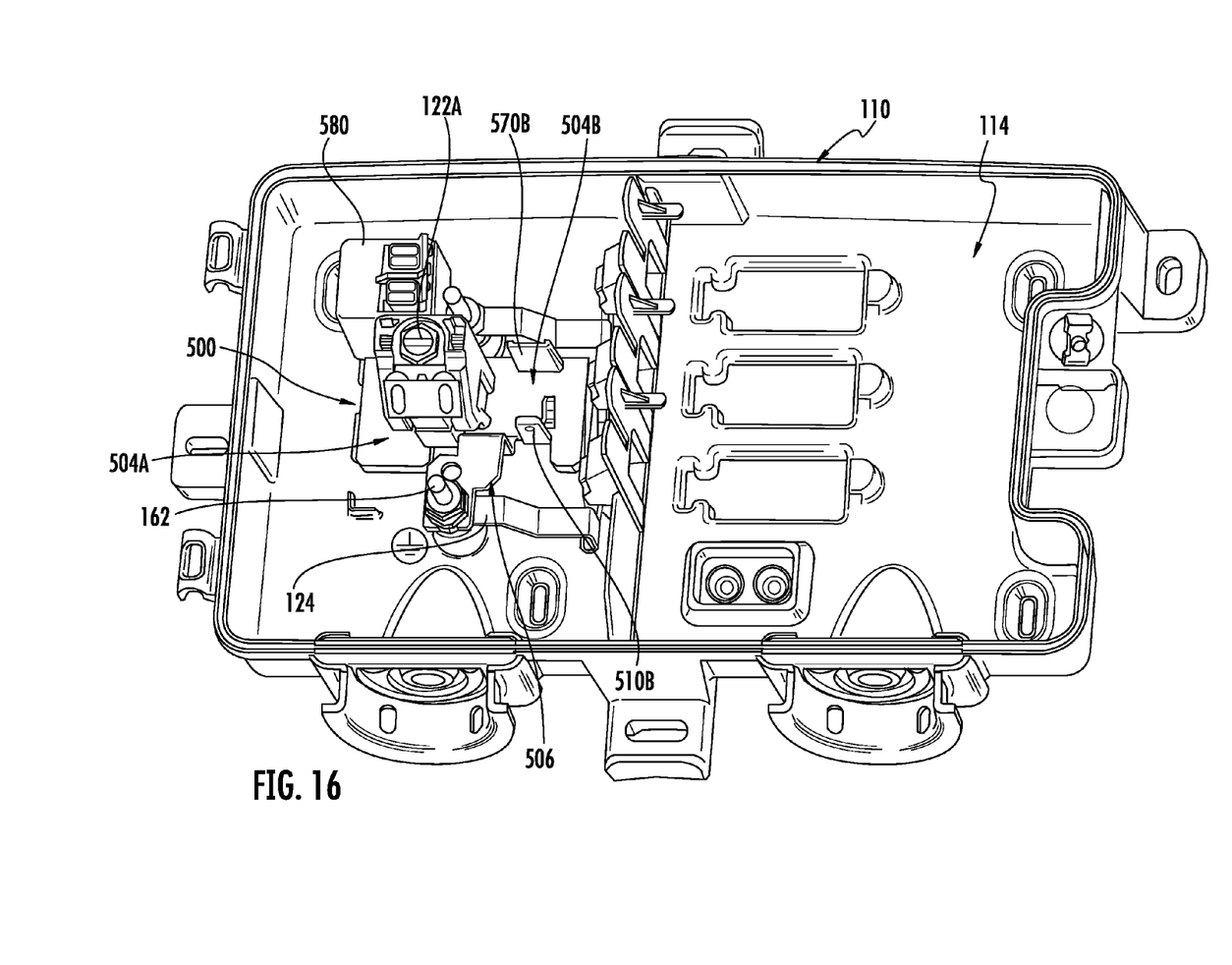
FIG. 16 is a perspective view of the network interface device of FIG. 1 employing the adapter of FIGS. 12 and 14.

Referring to FIGS. 12-16, alternative embodiments of an adapter 500 are illustrated. Here, adapter 500 may include a body 502, a pair of ground mount areas 504A, 504B on body 502 for mounting one or two protector modules 122A, 122B, and a connector 506 extending from body 504 to conductively couple to a grounding element 124 (FIG. 16) of NID 110. NID 110 in FIG. 16 is substantially similar to that shown in FIGS. 1 and 7, but could be any NID. FIG. 12 shows adapter 500 without any protector modules coupled thereto; FIGS. 13, 15 and 16 show adapter 500 with one protector module 122A coupled thereto; and FIG. 14 shows adapter 500 with two protector modules 122A, 122B coupled thereto.

Each ground mount area 504A, 504B may include a respective ground post 510A, 510B extending from body 502 and configured to conductively couple to a respective protector module 122A, 122B. In particular, as shown in for example FIG. 13, ground post 510A is dimensioned to be received in the ground post receptacle 150 (FIG. 6) in protector module 122A to make electrically conductive path from internal circuitry of protector module 122A to adapter 500. That is, each ground post 510A, 510B has a length, width and/or height to fit securely and snugly in ground post receptacle 150, as shown in FIGS. 13 and 14, such that protector module 122A, 122B cannot slip off of respective ground posts 510A, 510B without sufficient external force being applied.

In the example shown in FIGS. 12 and 14, each ground mount area 504A, 504B includes a single respective ground post 510A, 510B and an opposing alignment post 570A, 570B configured to engage with the protector module. That is, alignment post 570A, 570B may align with an opening 127 (FIG. 4) on back side 126 (FIG. 4) of a protector module 122A, 122B to provide additional module alignment and/or retention, if desired. Here, an insulative cover 530 extends over at least a portion of body 502, and the opposing alignment posts 570A, 570B extend from the insulative cover. That is, alignment posts 570A, 570B are formed as part of the insulative cover, e.g., of molded plastic. FIG. 15 illustrates that adapter 500 need not include an insulative cover 530 (FIGS. 12-14) and may be made of a single conductive material. In this embodiment, each ground post 510A, 510B may include an opposing ground post 512A (512B hidden behind 122B) that may act as alignment post when not in use, as described relative to FIG. 6. Opposing ground posts 510A, 512A and 510B, 512B also allow for protector modules 122A, 122B to be coupled to body 502 facing in either direction, which may accommodate ease of mounting and interconnection with other components within NID 110 (e.g., line module 120 (FIG. 1)), and coupling of adapter 500 to grounding element 124.

As shown in FIGS. 12, 14, 15 and 16, adapter 500 may also include an insulation displacement contact (IDC) module 580 coupled to at least one of insulative cover 530 (FIGS. 12, 14 and 16) and body 502 (FIG. 15). As understood in the field, an insulation displacement contact ("IDC") module includes a number of wire insertion holes 582 (FIG. 12) having an actuating arm 584 (FIG. 12) for electrically connecting wiring to the IDC module. Each wire insertion hole 582 (FIG. 12) includes therein opposed, sharp edges (not shown) for piercing the insulation surrounding a conductive wire 586 (FIGS. 13, 15) (e.g., from protector module 122A), thereby establishing electrical continuity between conductive wire 586 and an insulation displacement contact within the IDC module. Each conductive contact within IDC module 580 may thereafter couple to wiring 588 extending therefrom, or another conductive contact on IDC module 580, for connection to other structures (e.g., line module 120 (FIGS. 1-3)) requiring coupling to protector module 122A. In operation, the actuating arm 584 is placed in the "disconnect" position and conductive wire 586 is inserted into a wire insertion hole 582 of IDC module 580. Actuating arm 584 is then moved from the "disconnect" position to the "connect" position to force conductive wire 586 into engagement with the IDC module and thereby electrically connecting conductive wire 586 to wiring 588 (and, e.g., line module 120 (FIG. 1)). Although the operation of only a single actuating arm 584, IDC and wire insertion hole 582 has been described herein, IDC module 580 may be provided with any number of wire insertion holes 582, insulation displacement contacts and corresponding actuating arms 584. In FIGS. 12, 14 and 16, IDC module 580 is illustrated as being part of insulative cover 530; however, as shown in FIG. 15, IDC module 580 may be otherwise coupled to body 502, e.g., by fasteners, adhesive, etc., where an insulative cover is not provided. The position of IDC module 580 could also be changed to accommodate different NIDs.

Connector 506 extends from body 502 and is configured to conductively couple to grounding element 124 (FIG. 16) of the NID. In FIGS. 12-16, connector 506 is illustrated as including a U-shaped, conductive tang 514 configured to conductively couple with grounding element 124 of the NID, as described relative to FIGS. 5-8. It is understood, however, connector 506 may take any form described herein relative to FIGS. 9 and 10. As shown in FIG. 12, connector 506 may also include a first portion 520 extending from body 502 at a non-linear angle, and a second portion 522 extending from first portion 520 at a non-linear angle, so as to allow for coupling of adapter 500 in a first plane to grounding element 124 (FIG. 16) different than a second plane in which body 502 and ground mount areas 504A, 504B are disposed. In this fashion, protector module 122A and/or 122B may be coupled to grounding element 124 (FIG. 16) yet be positioned as far into base 114 of the NID as possible. Different size connectors may be dimensioned to accommodate different NIDS. In addition to portions 520, 522, a third portion 524 may extend in an offset manner from second portion 522. Here, the U-shaped tang is provided in third portion 524 such that third portion 524 is configured to conductively couple to the grounding element of the NID. As shown in FIG. 16, connector 506 configured in this fashion is used to allow for appropriate clearance within NID 110.

While adapter 500 and protector module 122A have been illustrated in a selected location within NID 110 in FIG. 16, connector 406 allows for protector module 122A and/or 122B to be positioned in a number of alternative positions. For example, in FIG. 16, adapter 500 could couple the module(s) in a number of alternative positions in the approximately 180° space about the selected threaded post 162 where appropriate space for IDC module 580 is provided. For example, three (3) positions may be possible: as is illustrated, rotated counterclockwise 90° and rotated counterclockwise 180°. Adapter 200 could also couple the module(s) to any of the threaded posts 162 shown in FIG. 16. Where IDC module 580 is not provided, additional options for positioning may be available. For example, in NID 110 in FIG. 16, adapter 500 could be positioned in more than three (3) positions about any selected threaded post 162; and in NID 180 in FIG. 8, adapter 500 could be coupled to any selected threaded post 262 and on either side of ground bar 260. Where both ground posts 510A, 510B and 512A, 512B (FIG. 15) are employed, protector module(s) could face in a direction opposite to that shown in FIG. 16.

While a number of alternative embodiments have been described herein relative to the adapter, it is understood that a variety of other structures, e.g., connectors, may be provided and are considered within the scope of the invention. In addition, while particular embodiments have been illustrated, it is understood that the described structures within each embodiment can be interchanged between the embodiments. Further, while embodiments of adapters have been described herein with mount areas for one or a pair of protector modules, it is understood that adapters with more than a pair of mount areas for accommodating more than two protector modules may be possible with an elongation of the body and provision of additional ground posts. Such adapters are considered within the scope of the invention.

As described herein, the adapters allow the reuse of existing protector modules that do not have a ground adapter (e.g., tang) for direct mounting to ground post. The adapters use vertical ground post features as found in many NIDs, such as the UNID available from Corning Optical Communications LLC.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An adapter for grounding a protector module in a network interface device (NID), the adapter comprising:
   a body;
   at least one ground mount area on the body, each ground mount area including a ground post extending from the body and configured to conductively couple to the protector module; and
   a connector extending from the body and configured to conductively couple to a grounding element of the NID,
   wherein the body, the at least one ground post and the connector are conductive.

2. The adapter of claim 1, wherein the ground post includes a pair of ground posts extending from opposing sides of the body.

3. The adapter of claim 1, wherein the connector is shaped so as to conductively couple to the grounding element of the NID in a first plane different than a second plane in which the body is disposed.

4. The adapter of claim 1, wherein the connector includes a first portion extending from the body at a non-linear angle, and a second portion extending from the first portion at a non-linear angle.

5. The adapter of claim 1, wherein the at least one ground mount area includes a pair of ground mount areas, each ground post of the pair of ground mount areas including an opposing alignment post configured to engage with the protector module.

6. The adapter of claim 5, further comprising an insulative cover over at least a portion of the body, and wherein the opposing alignment posts extend from the insulative cover.

7. The adapter of claim 5, further comprising an insulation displacement contact (IDC) module coupled to at least one of the insulative cover and the body.

8. The adapter of claim 7, further comprising at least one wire conductively coupled to and extending from the IDC module for selective conductive coupling to the protector module.

9. The adapter of claim 5, wherein the connector includes:
   a first portion extending from the body at a non-linear angle;
   a second portion extending from the first portion at a non-linear angle; and
   a third portion extending in an offset manner from the second portion, the third portion configured to conductively couple to the grounding element of the NID.

10. The adapter of claim 1, further comprising an insulative cover over at least a portion of the body.

11. The adapter of claim 1, wherein the connector includes a U-shaped, conductive tang configured to conductively couple with the grounding element of the NID.

12. The adapter of claim 1, wherein the connector includes a post configured to conductively couple with the grounding element of the NID.

13. The adapter of claim 1, wherein the connector includes a threaded fastener configured to conductively couple with a mating element of the grounding element of the NID.

14. An adapter for grounding a protector module in a network interface device (NID), the adapter comprising:
    a body;
    a pair of ground mount areas on the body, each ground mount area including a ground post extending from the body and configured to conductively couple to the protector module; and
    a connector extending from the body and configured to conductively couple to a grounding element of the NID,
    wherein the body, the ground posts and the connector are conductive.

15. The adapter of claim 14, wherein the connector is shaped so as to conductively couple to the grounding element of the NID in a first plane different than a second plane in which the body is disposed.

16. The adapter of claim 14, wherein the connector includes a first portion extending from the body at a non-linear angle, and a second portion extending from the first portion at a non-linear angle.

17. The adapter of claim 14, wherein the pair of ground mount areas each include an alignment post configured to engage with the protector module.

18. The adapter of claim 17, further comprising an insulative cover over at least a portion of the body, and wherein the opposing alignment posts extend from the insulative cover.

19. The adapter of claim 14, further comprising an insulation displacement contact (IDC) module coupled to at least one of the insulative cover and the body.

20. The adapter of claim 19, further comprising at least one wire conductively coupled to and extending from the IDC module for selective conductive coupling to the protector module.

21. The adapter of claim 14, wherein the connector includes:

a first portion extending from the body at a non-linear angle;

a second portion extending from the first portion at a non-linear angle; and a third portion extending in an offset manner from the second portion, the third portion configured to conductively couple to the grounding element of the NID.

22. The adapter of claim 14, further comprising an insulative cover over at least a portion of the body.

23. The adapter of claim 14, wherein the connector includes a U-shaped, conductive tang configured to conductively couple with the grounding element of the NID.

24. The adapter of claim 14, wherein the connector includes a post configured to conductively couple with the grounding element of the NID.

25. The adapter of claim 14, wherein the connector includes a threaded fastener configured to conductively couple with a mating element of the grounding element of the NID.

* * * * *